(12) United States Patent
Ritter et al.

(10) Patent No.: US 9,357,696 B2
(45) Date of Patent: Jun. 7, 2016

(54) DRIVE COUPLER FOR A RECIPROCATING KNIFE

(71) Applicant: DEERE & COMPANY, Moline, IL (US)

(72) Inventors: Aaron S Ritter, Milan, IL (US); Austin Hughes, Kaysville, UT (US)

(73) Assignee: DEERE & COMPANY, Moline, IL (US)

( * ) Notice: Subject to any disclaimer, the term of this patent is extended or adjusted under 35 U.S.C. 154(b) by 214 days.

(21) Appl. No.: 13/932,614

(22) Filed: Jul. 1, 2013

(65) Prior Publication Data

US 2015/0000237 A1    Jan. 1, 2015

(51) Int. Cl.
*A01D 34/00*    (2006.01)
*A01D 34/02*    (2006.01)
*A01D 34/14*    (2006.01)

(52) U.S. Cl.
CPC .............. *A01D 34/02* (2013.01); *A01D 34/145* (2013.01)

(58) Field of Classification Search
CPC ..................................................... A01D 34/02
USPC .......................... 56/10.1, 158, 257–263, 296
See application file for complete search history.

(56) References Cited

U.S. PATENT DOCUMENTS

| | | | |
|---|---|---|---|
| 3,388,539 A * | 6/1968 | Novak | 56/257 |
| 3,896,610 A * | 7/1975 | Hiniker | 56/15.8 |
| 4,342,187 A * | 8/1982 | Shupert | 56/257 |
| 4,901,512 A * | 2/1990 | Castoldi | 56/293 |
| 4,909,025 A * | 3/1990 | Reissig et al. | 56/257 |
| 5,024,051 A * | 6/1991 | Glass et al. | 56/297 |
| 6,889,492 B1* | 5/2005 | Polk et al. | 56/257 |
| 7,313,903 B2* | 1/2008 | Schumacher et al. | 56/304 |
| 7,802,417 B2* | 9/2010 | Sauerwein et al. | 56/181 |
| 8,151,547 B2* | 4/2012 | Bich et al. | 56/158 |
| 2009/0145097 A1* | 6/2009 | Priepke | 56/257 |
| 2014/0190139 A1* | 7/2014 | Cook et al. | 56/10.1 |

* cited by examiner

*Primary Examiner* — Thomas B Will
*Assistant Examiner* — Mai Nguyen

(57) ABSTRACT

A drive coupler (102, 104) for coupling a reciprocating knife (106) to a drive member (112, 114) is provided, wherein the reciprocating knife (106) includes at least one elongate bar (120, 122, 180, 182) having a longitudinal extent and fixed to a plurality of blades (138), wherein the at least one elongate bar (120, 122, 180, 182) is supported on support members (140) that constrain the at least one elongate bar (120, 122, 180, 182) to reciprocate in a direction generally parallel to the longitudinal extent of the at least one elongate bar (120, 122, 180, 182), the drive coupler (102, 104) comprising: a first elongate strap (146, 162) configured to be attached to the at least one elongate bar (120, 122, 180, 182); a second elongate strap (146, 162) configured to be attached to the at least one elongate bar (120, 122, 180, 182); and an arrangement (152, 164, 187, 189, 193, 200) for (i) flexing the first elongate strap (146, 162) with respect to the second elongate strap (146, 162), (ii) for flexing the first elongate strap (146, 162) with respect to the drive member (112, 114), and (iii) for flexing the second elongate strap (146, 162) with respect to the drive member (112, 114).

15 Claims, 7 Drawing Sheets

DRIVE COUPLER FOR A RECIPROCATING KNIFE

FIELD

This invention relates to agricultural harvesting equipment. More particularly, it relates to reciprocating knives. Even more particularly, it relates to couplings for reciprocating knives.

BACKGROUND

Agricultural harvesting machines, such as draper platforms, include a reciprocating knife disposed at the leading edge of the harvesting machine. These reciprocating knives are formed of an elongate bar to which many small knife blades are attached. The elongate bar is driven back and forth, in a direction parallel to the longitudinal extent of the reciprocating knife. The reciprocating knife also includes knife guards that extend generally fore and aft (i.e. a direction perpendicular to the longitudinal extent of the elongate bar). The knife guards serve as stationary guides that divide the crop every few inches. The knife guards also have fore and aft extending knife edges against which the edges of the small knife blades.

Drive mechanisms of a variety of constructions are coupled to the elongate bar and drive the elongate bar back and forth. This causes the small knife blades to slide back and forth with respect to the knife guards and to sever crop plants that are caught between the small knife blades and the knife guards.

At the same time that the reciprocating knives have been increasing in length, the reciprocating knives have been designed to flex up and down following the contours of the land over which they travel. This permits the reciprocating knives to more closely follow the contours of the land over which they travel. In order to have a flexible reciprocating knife, the elongate bar cannot be increased in its cross-sectional dimensions, since any increase in cross-sectional dimensions would make the elongate bar more rigid and less able to flex. In order to the now-heavier reciprocating knives of modern designs, the couplers that attach to the elongate bar to and drive it are made longer and longer.

One problem with this arrangement is that the couplers are made longer, and are attached over greater length to a relatively flexible elongate bar. This causes stresses in the elongate bar that cause the elongate bar to break.

It is an object of this invention to provide a drive coupler for a reciprocating knife of an agricultural harvesting machine that reduces the stresses in the elongate bar of the reciprocating knife and reduces the probability that it will fatigue under the reciprocating loads and break.

SUMMARY

In accordance with one aspect of the invention, a drive coupler for coupling a reciprocating knife to a drive member is provided, wherein the reciprocating knife includes at least one elongate bar having a longitudinal extent and fixed to a plurality of blades, wherein the at least one elongate bar is supported on support members that constrain the at least one elongate bar to reciprocate in a direction generally parallel to the longitudinal extent of the at least one elongate bar, the drive coupler comprising: a first elongate strap configured to be attached to the at least one elongate bar; a second elongate strap configured to be attached to the at least one elongate bar; and a means for (i) flexing the first elongate strap with respect to the second elongate strap, (ii) for flexing the first elongate strap with respect to the drive member, and (iii) for flexing the second elongate strap with respect to the drive member.

The means may comprise at least two flexible joints.

The at least two flexible joints may comprise a resilient member.

The at least two flexible joints may comprise a pin.

The at least two flexible joints may comprise an annulus.

The pin may be disposed inside the annulus.

The means may comprise a first pin that is fixed to and that extends upwardly from at least one of the first elongate strap and the second elongate strap.

The means may comprise a second pin that is fixed to and that extends upwardly from at least a second one of the first elongate strap and the second elongate strap.

The means may comprise a first resilient member in the form of a ring that surrounds the first pin.

The means may comprise a first resilient member in the form of a ring that surrounds the first pin; and a second resilient member in the form of a ring that surrounds the second pin.

The means may comprise a first annulus that is fixed to at least one of the first elongate strap and the second elongate strap.

The means may comprise a second annulus that is fixed to at least a second one of the first elongate strap and the second elongate strap.

The first elongate strap may have a first plurality of holes that are spaced apart along the first elongate strap, and each of the first plurality of holes may be configured to receive a removable fastener to fasten the first elongate strap to the at least one elongate bar.

The second elongate strap may have a second plurality of holes that are spaced apart along the second elongate strap, and each of the second plurality of holes may be configured to receive a removable fastener to fasten the second elongate strap to the at least one elongate bar.

The at least one elongate bar may include a first elongate bar and a second elongate bar, and the first elongate strap may be configured to be fastened to the first elongate bar, and the second elongate strap may be configured to be fastened to the second elongate bar.

DETAILED DESCRIPTION

In the Figures herein, the reciprocating knife has been cropped on both the left end and the right end. The portions of the reciprocating knife that have been cropped are identical in construction to the illustrated end portions of the reciprocating knife 106, and from which they extend in the same directions. In a typical agricultural harvesting head, the reciprocating knife extends between 5 and 10 m both to the left and to the right from the central region illustrated in FIG. 1.

The term "side-to-side", "sideways", or "lateral" refer to a direction that is horizontal and generally parallel to the longitudinal extent of the reciprocating knife and perpendicular to a direction of travel "V" of the machine as it travels through the field harvesting crops. The terms "in front of", "front", "forward", "fore" and the like refer to a direction parallel to the direction of travel "V". The terms "back", "rear", "behind", "to the rear of" and the like refer to a direction opposite to the direction of travel "V".

Figure 1:
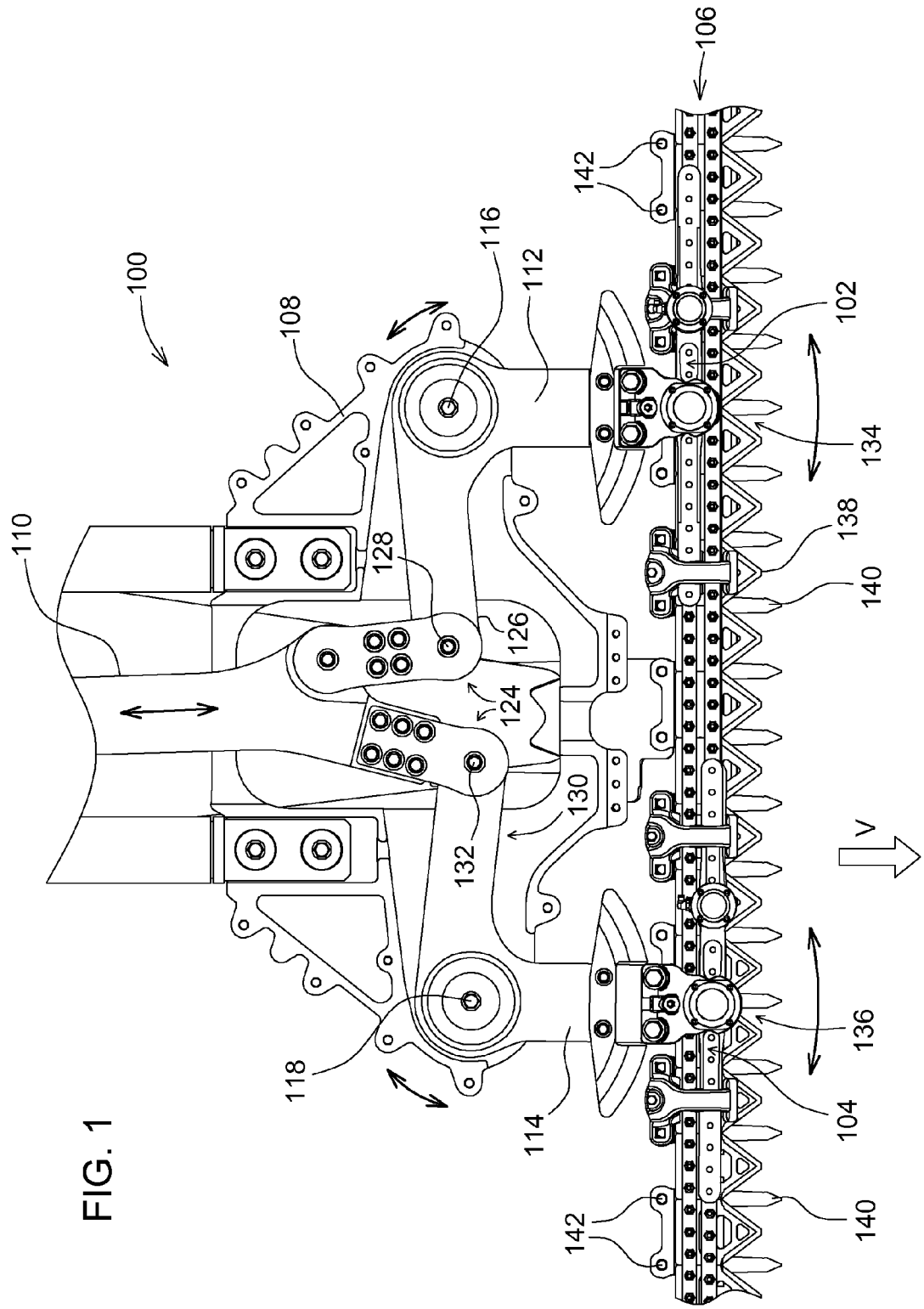
FIG. 1 is a partial cutaway view of a central region of a reciprocating knife, a drive mechanism for driving the reciprocating knife, and a drive coupler for coupling the reciprocating knife to the drive mechanism.

FIG. 1 illustrates a drive mechanism 100, a left side drive coupler 102, a right side drive coupler 104, and a reciprocating knife 106.

The drive mechanism comprises a frame 108 that houses a first reciprocating drive member 110 a left side drive member 112, and a right side drive member 114.

The frame 108 supports the first reciprocating drive member 110, which extends fore and aft and is driven in a fore and aft direction (indicated by the double ended arrow superimposed thereon) by a power source (not shown).

The left side drive member 112 is supported on the frame 108 to pivot with respect to the chassis about a first pivot joint 116 in the direction indicated by the double ended arrow adjacent to the left side drive member 112.

The right side drive member 114 is supported on the frame 108 to pivot with respect to the frame 108 about a second pivot joint 118 in the direction indicated by the double ended arrow adjacent to the right side drive member 114.

The reciprocating knife 106 includes a front elongate bar 120 and a rear elongate bar 122. The front elongate bar 120 and the rear elongate bar 122 extend laterally, perpendicular to the direction of travel "V" of the reciprocating knife 106 as it is carried through the field harvesting crops.

The front elongate bar 120 is fixed to the right side drive coupler 104, which in turn is fixed to the right side drive member 114.

The rear elongate bar 122 is fixed to the left side drive coupler 102, which in turn is fixed to the left side drive member 112.

When the first reciprocating drive member 110 is driven forward (i.e. parallel to the direction "V", the front end 124 of the first reciprocating drive member 110 moves forward.

The front end 124 is pivotally coupled to the proximal end 126 of the left side drive member 112 at a third pivot joint 128. The front end 124 is also pivotally coupled to the proximal end 130 of the right side drive member 114 at a fourth pivot joint 132.

The first pivot joint 116 and the second pivot joint 118 are fixed with respect to the frame 108, and thus the forward motion of the first reciprocating drive member 110 causes the left side drive member 112 to pivot in a counterclockwise direction (in FIG. 1) about the first pivot joint 116.

In a similar manner, the forward motion of the first reciprocating drive member 110 causes the right side drive member 114 to pivot in a clockwise direction (in FIG. 1) about the second pivot joint 118.

When the left side drive member 112 pivots in a counterclockwise direction, the forward end 134 of the left side drive member 112 translates outwardly (i.e. to the right in FIG. 1). When the right side drive member 114 pivots in a clockwise direction, the forward end 136 of the right side drive member 114 also translates outwardly (i.e. to the left in FIG. 1).

Thus, forward motion of the first reciprocating drive member 110 causes the forward ends of the two drive members to move away from each other in opposite directions.

Since each drive member is coupled to a different elongate bar, this causes the two elongate bars to translate away from each other in opposite directions.

Following the reverse logic of the above description, rearward motion of the first reciprocating drive member 110 causes the forward ends of the two drive members to translate towards each other in opposite directions.

The forward end 134 of the left side drive member 112 is coupled to the rear elongate bar 122. The forward end 136 of the right side drive member 114 is coupled to the front elongate bar 120. Thus, the front elongate bar 120 and the rear elongate bar 122 translate in opposite directions both outwardly and inwardly (and perpendicular to the direction of travel "V") as the first reciprocating drive member 110 travels in a forward direction and a rear direction, respectively.

The reciprocating knife 106 also comprises a plurality of blades 138 that are bolted to the front elongate bar 120 and the rear elongate bar 122. The plurality of blades 138 are alternatively attached to the front elongate bar 120 and the rear elongate bar 122 such that every other blade of the plurality of blades 138 along the length of the reciprocating knife 106 moves with the front elongate bar 120 and every other blade of the plurality of blades 138 along the length of the reciprocating knife 106 moves with the rear elongate bar 122. This causes the blades to overlap each other in their motions and permits the shearing of crop passing between adjacent blades.

The reciprocating knife 106 also comprises a plurality of stationary guards 140 that are spaced apart with respect to each other along the length of the reciprocating knife 106. The plurality of stationary guards 140 include recesses (see e.g. FIG. 5) that cradle the front elongate bar 120 and the rear elongate bar 122. The plurality of stationary guards 140 include mounting holes 142 (see FIG. 5) through which bolts are passed that fix the plurality of stationary guards 140 to forwardly extending floating arms (not shown) that extend from a rear frame of the agricultural harvesting head. Thus, the plurality of stationary guards 140 are held stationary with respect to the frame 108, and with respect to the front elongate bar 120 and its associated blades, and the rear elongate bar 122 and its associated blades. This permits the associated blades as they reciprocate back-and-forth against each other to also reciprocate back-and-forth against the stationary guards 140, causing shearing to occur both between the blades of the front elongate bar 120 and the rear elongate bar 122 and between the blades and the stationary guards 140.

Figure 2:
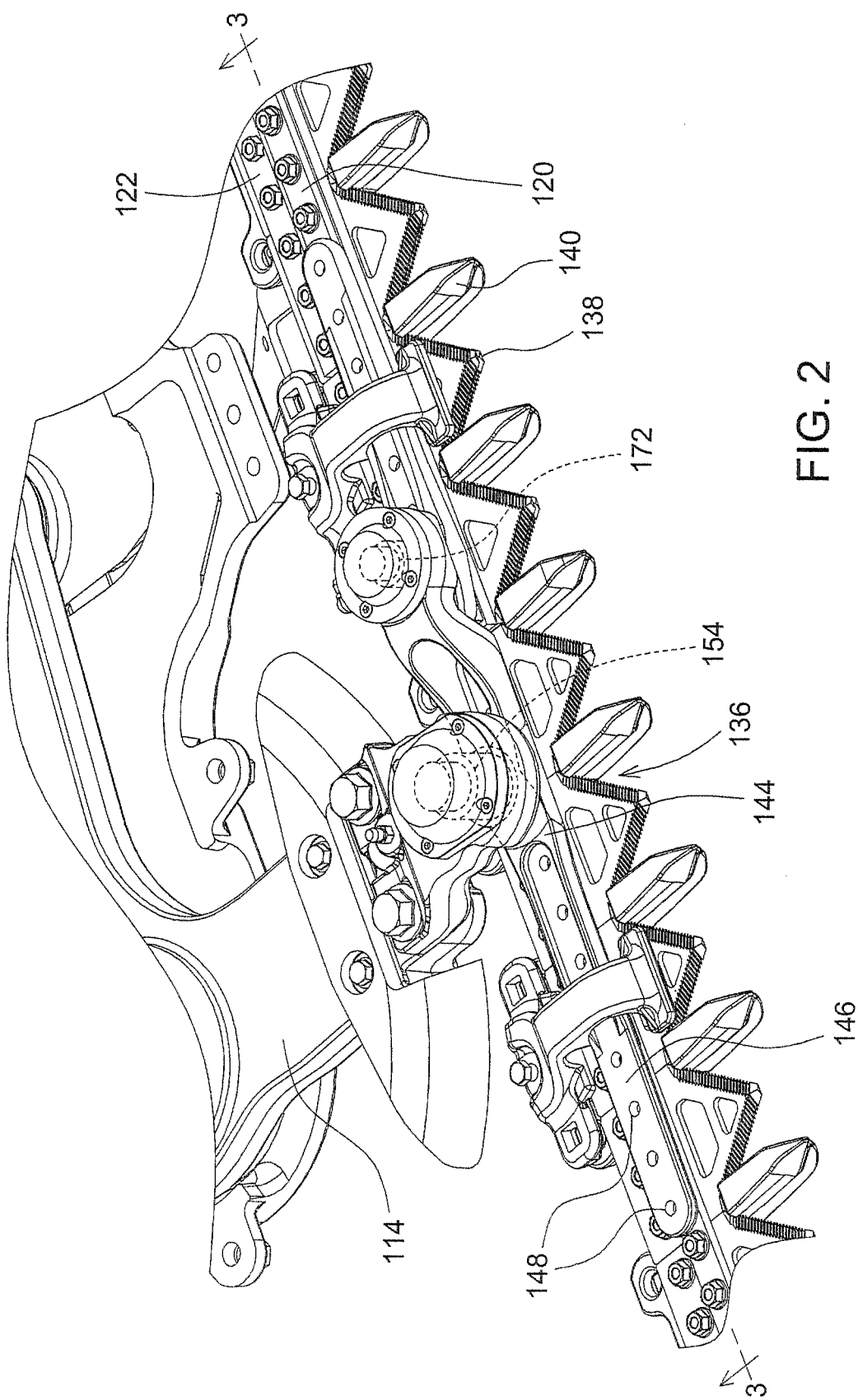
FIG. 2 is a perspective view of the left-hand side drive coupler, the drive mechanism, and the reciprocating knife of FIG. 1.
Figure 3:
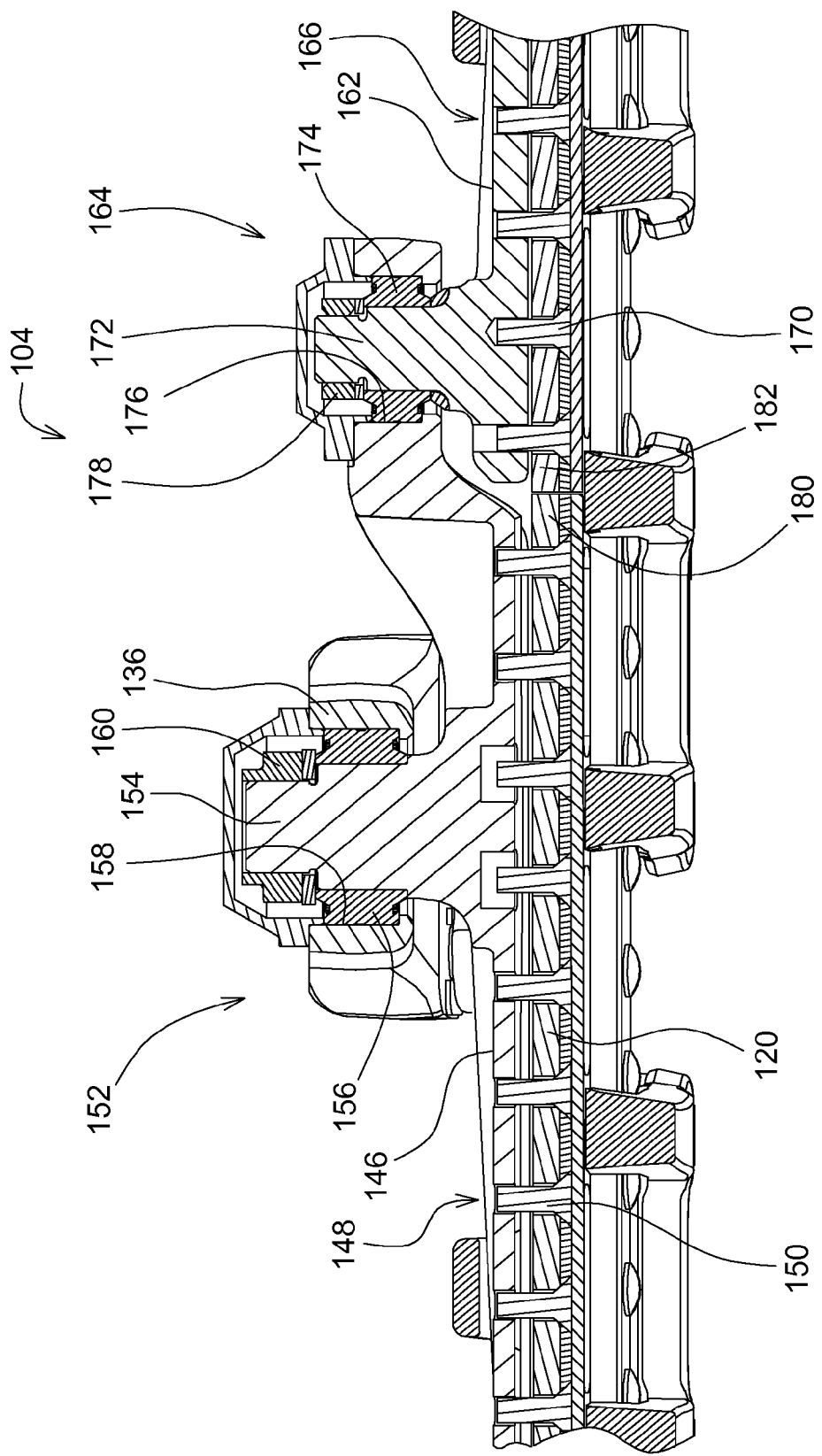
FIG. 3 is a cross-sectional view of the arrangement of FIG. 2 taken at section line 3-3 in FIG. 2.

FIGS. 2 and 3 illustrate details of the right side drive member 114, the right side drive coupler 104, and the reciprocating knife 106. The left side drive member 112 and the left side drive coupler 102 are identically arranged, and therefore are not shown or described in detail herein.

In FIG. 2, the right side drive coupler 104 comprises a first elongate member 144 which further comprises an first elongate strap 146 with a plurality of holes 148 that extend therethrough. The plurality of holes 148 are aligned with corresponding holes in the front elongate bar 120. A first plurality of screws 150 extend upward through the corresponding holes in the front elongate bar 120 and are threadedly engaged with the plurality of holes 148. In this manner, the first elongate strap 146 is secured to the front elongate bar 120.

The right side drive coupler 104 further comprises a first flexible joint 152 that is formed integral with the first elongate strap 146. The first flexible joint 152 is fixed to one end of the first elongate strap 146. The first flexible joint 152 comprises a first pin 154 that extends vertically.

The first flexible joint 152 further comprises a first resilient member 156 in the form of a ring that extends about the circumference of the first pin 154. The first resilient member 156 is received in an annulus 158 in the forward end 136 of the right side drive member 114. The first resilient member and any of the resilient members referred to herein are formed of a polymeric material, such as urethane or an elastomer. Any of the resilient members referred to herein may comprise or include one or more spherical bearings. Alternatively, they may comprise or include springs such as coil springs, leaf springs, Belleville springs, spring washers or the like to permit the pins to flex with respect to the annuli that surround and support them.

The resilient coupling permits the first pin 154 (and hence the first flexible joint 152, and the right side drive coupler 104 also) to flex with respect to the forward end 136.

This flexing permits the forward end 136 to follow a slightly arcuate but generally side to side path defined by its pivoting about the second pivot joint 118 yet also permits the front elongate bar 120 follow a straight line path defined by recesses in the stationary guards 140 that receive, guide and support the front elongate bar 120.

The first flexible joint 152 further comprises a removable fastener 160, here shown as a nut, which is threadedly engaged to an upper end of the first pin 154. The removable fastener 160 secures the first flexible joint 152 to the forward end 136 of the right side drive member 114.

The right side drive coupler 104 further comprises a second elongate strap 162 that is flexibly coupled to the first elongate strap 146 (and hence the first elongate member 144) by a second flexible joint 164. The second elongate strap 162 extends laterally and above the front elongate bar 120. The second elongate strap 162 defines a second plurality of holes 166 that are spaced out along the length of the second elongate strap 162. The second plurality of holes 166 are aligned with a corresponding plurality of holes in the forward elongate bar. A second plurality of screws 170 extend upward from the corresponding plurality of holes in the forward elongate bar and are threadedly engaged into the second plurality of holes 166 thereby fixing the second elongate strap 162 to the front elongate bar 120.

The second flexible joint 164 is constructed substantially the same as the first flexible joint 152. It comprises a second pin 172 that extends upward from and is formed integral with the second elongate strap 162. The second flexible joint 164 further comprises a second resilient member 174 that is like to the first resilient member 156. The second resilient member 174 is formed as a ring. The second resilient member 174 surrounds the second pin 172 and is received inside an annulus 176 formed in an end of the first elongate member 144. The annulus 176 is located on the first elongate member 144 in a position opposite to the first elongate strap 146.

The second flexible joint 164 further comprises a second removable fastener 178, here shown as a nut, which secures the second pin 172 in the annulus 176.

By this flexible joint arrangement, the first elongate strap 146 can flex with respect to the second elongate strap 162, and both the first elongate strap 146 and the second elongate strap 162 can flex with respect to the forward end 136 of the right side drive member 114.

The relative flexing of the first elongate strap 146 with respect to the second elongate strap 162 permits the front elongate bar 120 to move up and down in the region of the right side drive coupler 104 at its outer end.

The second flexible joint 164 (and particularly the second resilient member 174) permits flexing of the first elongate strap 146 with respect to the second elongate strap 162. However this flexing is constrained by the nature of the second resilient member 174 to flex about a point generally in the center of the second pin 172. In the illustrated embodiment this is located above the front elongate bar 120, as best shown in FIG. 3. If the front elongate bar 120 was continuous in the illustrated embodiment, any upward flexure of the second elongate strap 162 with respect to the first elongate strap 146 could apply a significant tensile force to the front elongate bar 120. For this reason, the front elongate bar 120 is configured in two adjacent sections that terminate adjacent to one another, with free ends facing each other and in an end-to-end relationship. A first section 180 of the front elongate bar 120 terminates immediately adjacent to a second section 182 of the front elongate bar 120. The first section 180 is attached to the first elongate strap 146, and the second section 182 is attached to the second elongate strap 162. The immediately adjacent ends of the first section 180 in the second section 182 are thereby permitted to move apart when the outer end of the second elongate strap 162 flexes upward with respect to the first elongate strap 146 and are permitted to move together when the outer end of the second elongate strap 162 flexes downward with respect to the first elongate strap 146. If the center of flexing defined by the second flexible joint 164 is located closer to (or in) the horizontal plane of the front elongate bar 120, the front elongate bar 120 may be made continuous.

Figure 4:
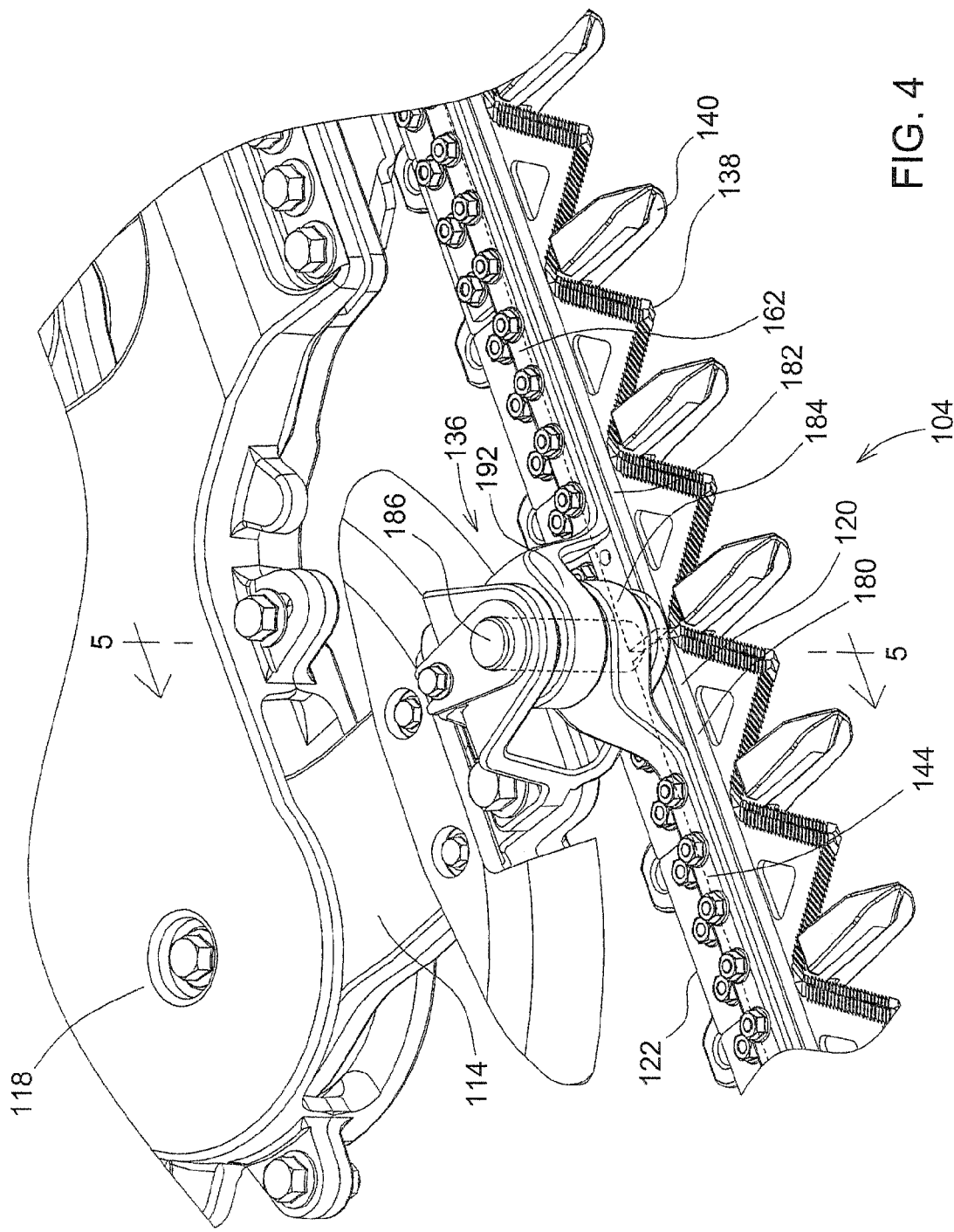
FIG. 4 is a perspective view of a second embodiment of the drive coupler, the drive mechanism, and the reciprocating knife
Figure 5:
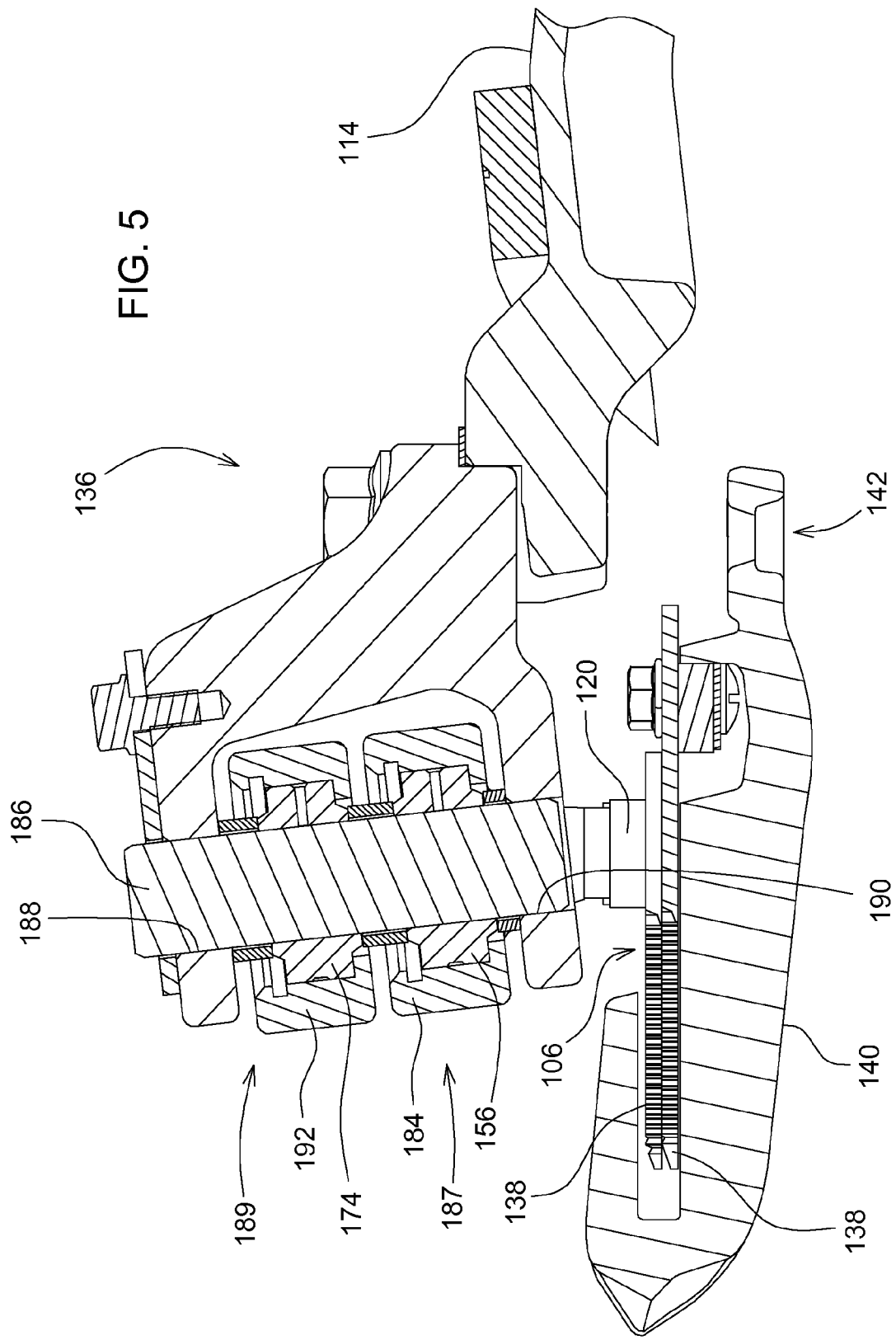
FIG. 5 is a cross-sectional view of the arrangement of FIG. 4 taken at section line 5-5 in FIG. 4.

FIGS. 4 and 5 illustrate a first alternative embodiment of the right side drive coupler 104. In the embodiment illustrated in FIGS. 4 and 5, the first elongate strap 146 is similarly attached to the front elongate bar 120 with a similar arrangement of holes and screws 150. The first elongate strap 146 is similarly formed integral with a first flexible joint 152 that couples the first elongate strap 146 to the forward end 136 of the right side drive member 114. In the arrangement illustrated in FIGS. 4 and 5, the second elongate strap 162 is similarly attached to the front elongate bar 120 with a similar arrangement of holes and screws 170. The second elongate strap 162 is similarly formed integral with a second flexible joint 164.

In the embodiment of FIGS. 4-5, a third flexible joint 187 is provided to couple the first elongate strap 146 to the forward end 136 of the right side drive member 114. Instead of a first pin 154 formed integral with the first elongate strap 146 as illustrated in FIGS. 1-3, the third flexible joint 187 is defined by an annulus 184, the first resilient member 156, and a pin 186.

The annulus 184 is formed integral with the first elongate strap 146. The annulus 184 houses the first resilient member 156. The first resilient member 156 surrounds a pin 186. The pin 186, in turn, is received and supported in an upper aperture 188 and a lower aperture 190 that are disposed on the forward end 136 of the right side drive member 114.

As the right side drive member 114 reciprocates back-and-forth generally parallel to the longitudinal extent of the front elongate bar 120 in the embodiment of FIGS. 4-5, the first resilient member 156 flexes and permits the first elongate strap 146 to flex with respect to the forward end 136 of the right side drive member 114 and also to flex with respect to the second elongate strap 162.

A fourth flexible joint 189 is provided to couple the second elongate strap 162 to the forward end 136 of the right side drive member 114. Instead of the second pin 172 formed integral with the second elongate strap 162 as illustrated in FIGS. 1-3, the fourth flexible joint 189 is defined by an annulus 192, the second resilient member 174, and the pin 186.

The annulus 192 is formed integral with the second elongate strap 162. The annulus 192 houses the second resilient member 174. The second resilient member 174 surrounds the pin 186.

As the right side drive member 114 reciprocates back and forth generally parallel to the longitudinal extent of the front elongate bar 120, the second resilient member 174 flexes and permits the second elongate strap 162 to flex with respect to the forward end 136 of the right side drive member 114 and also permits the second elongate strap 162 to flex with respect to the first elongate strap 146.

As in the embodiment of FIGS. 1-3, the front elongate bar 120 is provided in two sections—the first section 180 and the second section 182—for the same reasons described above with regard to FIGS. 1-3.

Figure 6:
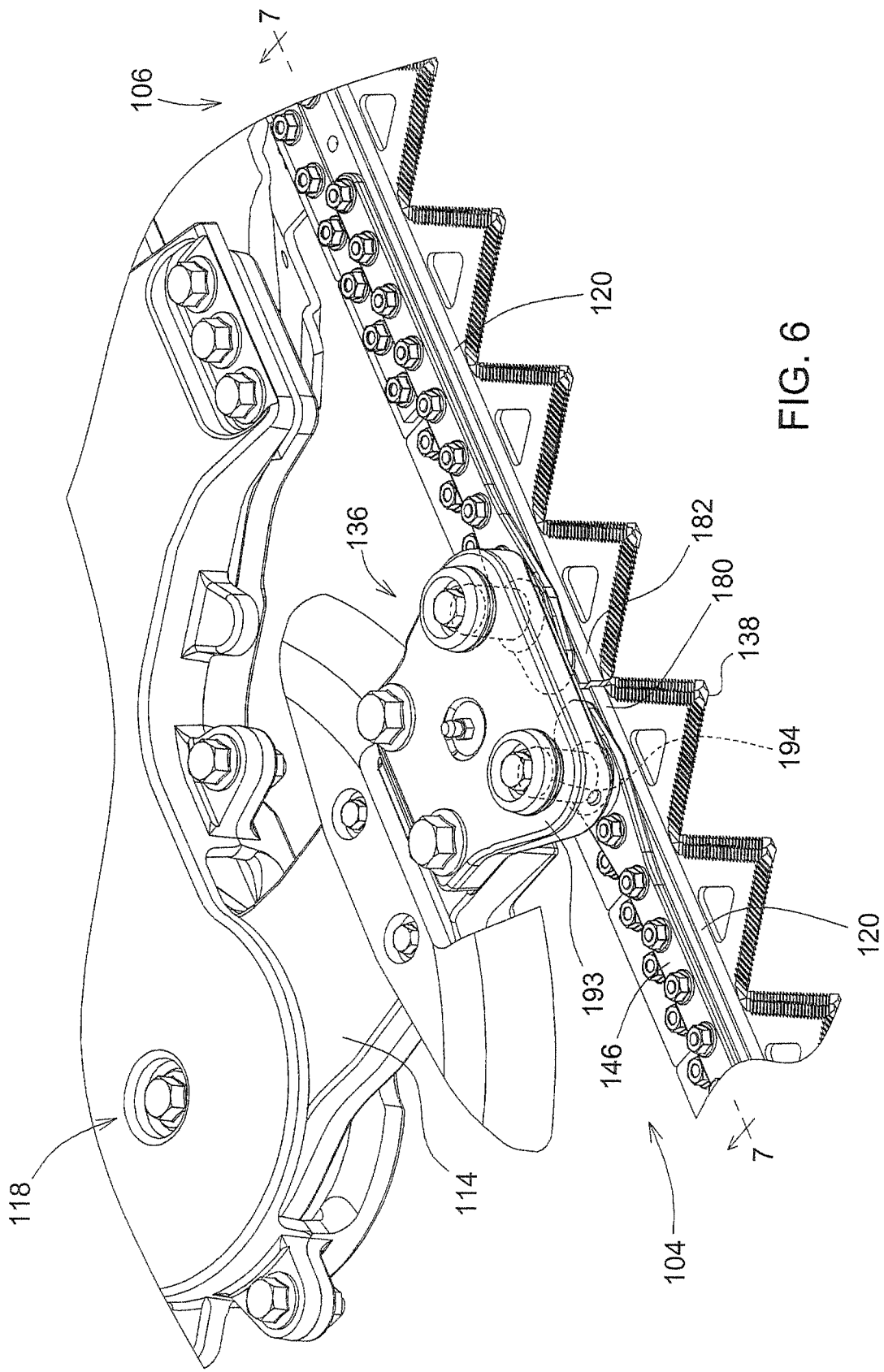
FIG. 6 is a perspective view of a third embodiment of the drive coupler, the drive mechanism and the reciprocating knife.
Figure 7:
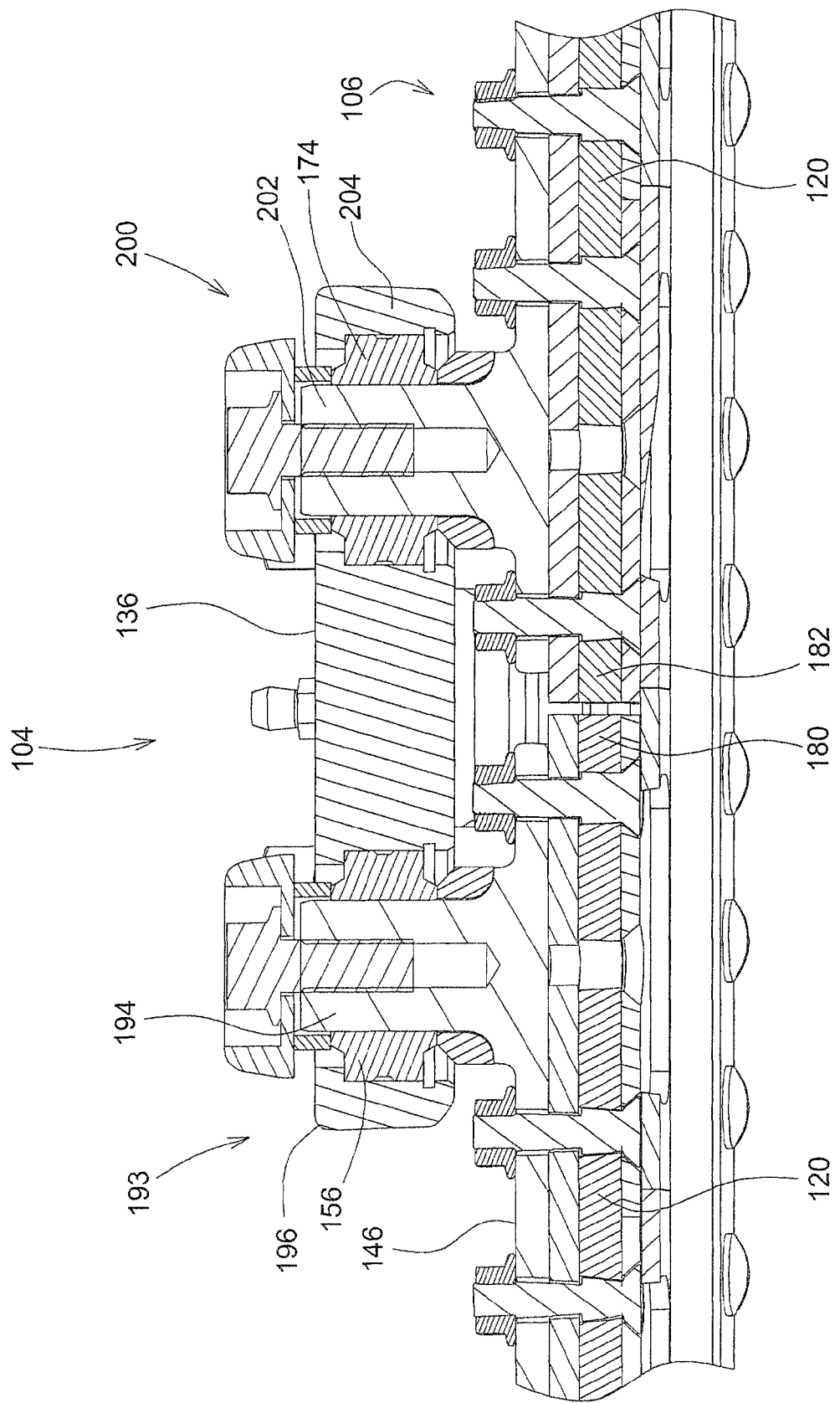
FIG. 7 is a cross-sectional view of the arrangement of FIG. 6 taken at section line 7-7 in FIG. 6.

FIGS. 6 and 7 illustrate a second alternative embodiment of the right side drive coupler 104.

In the embodiment of FIGS. 6-7, a fifth flexible joint 193 is provided to couple the first elongate strap 146 to the forward end 136 of the right side drive member 114. The fifth flexible joint 193 is defined by a pin 194, the first resilient member 156, and an annulus 196.

The pin 194 is formed integral with the first elongate strap 146 and extends vertically upward therefrom. The annulus 196 is fixed to the forward end 136 of the right side drive member 114. The annulus 196 houses the first resilient member 156. The first resilient member 156 surrounds the pin 194.

As the right side drive member 114 reciprocates back and forth generally parallel to the longitudinal extent of the front elongate bar 120, the first resilient member 156 flexes and permits the first elongate strap 146 to flex with respect to the forward end 136 of the right side drive member 114.

A sixth flexible joint 200 is provided to couple the second elongate strap 162 to the forward end 136 of the right side drive member 114. The sixth flexible joint 200 is defined by a pin 202, the second resilient member 174, and an annulus 204.

The pin 202 is formed integral with the second elongate strap 162 and extends vertically upward therefrom. The annulus 204 is fixed to the forward end 136 of the right side drive member 114. The annulus 204 houses the second resilient member 174. The second resilient member 174 surrounds the pin 202.

As the right side drive member 114 reciprocates back and forth generally parallel to the longitudinal extent of the front elongate bar 120, the second resilient member 174 flexes and permits the second elongate strap 162 to flex with respect to the forward end 136 of the right side drive member 114 and also permits the second elongate strap 162 to flex with respect to the first elongate strap 146.

As in the embodiments of FIGS. 1-5, the front elongate bar 120 is provided in two sections—the first section 180 and the second section 182 for the same reasons described above with regard to FIGS. 1-5.

Each of the three embodiments of the right side drive coupler 104 illustrated and described herein are constructed the same as the left side drive coupler 102. For that reason, the left side drive coupler 102 has not been illustrated in detail.

Each of the three embodiments comprises a first elongate strap 146 that is attached to the front elongate bar 120 and extends in a first lateral direction from the forward end 136 of the right side drive member 114 and is fixed to the front elongate bar 120 with a plurality of removable fasteners such as bolts or screws.

Each of the three embodiments also comprises a second elongate strap 162 that extends in a second lateral direction opposite the first lateral direction from the forward end 136 of the right side drive member 114 and is fixed thereto with a plurality of removable fasteners such as bolts or screws.

Each of the three embodiments also comprises a flexible joint arrangement that includes at least two flexible joints that permit the first elongate strap 146 and the second elongate strap 162 to flex with respect to each other and permit the first elongate strap 146 and the second elongate strap 162 to flex with respect to the forward end 136 of the right side drive member 114.

In the arrangement of FIGS. 1-3, one of these at least two flexible joints is provided to couple the first elongate strap 146 and the second elongate strap 162 directly to each other and another of these at least two flexible joints is provided to couple the first elongate strap 146 to the forward end 136 of the right side drive member 114.

In the arrangement of FIGS. 4-5, one of these at least two flexible joints is provided to couple the first elongate strap 146 to the forward end 136 and another of these at least two flexible joints is provided to couple the second elongate strap 162 to the forward end 136 of the right side drive member 114.

In the arrangement of FIGS. 6-7, one of these at least two flexible joints is provided to couple the first elongate strap 146 to the forward end 136 of the right side drive member 114, and another of these at least two flexible joints is provided to couple the second elongate strap 162 to the forward end 136 of the right side drive member 114.

It should be understood that the particular embodiments shown and discussed herein are not the only ways in which the invention can exist. They are the currently preferred embodiments of the invention. One skilled in the art of agricultural harvester and agricultural harvesting head design and manufacture can readily see other variations that would also fall within the scope of the appended claims.

For example, any of the three embodiments of the right side drive coupler 104 can be reversed in a lateral direction and mounted to the right side drive member 114 and the front elongate bar 120. Furthermore, any of the three embodiments of the right side drive coupler 104 can be used in place of the illustrated left side drive coupler 102 in FIG. 1. Furthermore, any of the three embodiments of the right side drive coupler 104 can be attached to the rear elongate bar 122 instead of the front elongate bar 120, and any of the embodiments of the left side drive coupler 102 can be attached to the front elongate bar 120 instead of the rear elongate bar 122. Furthermore, any of the embodiments of the right side drive coupler 104 can be used to drive a reciprocating knife 106 that supports only a single elongate bar. In the embodiments illustrated herein, the pins extend generally vertically and the central axes of the annuli extend generally vertically. In an alternative arrangement, these orientations can be changed such that the pins and the central axes of the annuli extend horizontally, or extend at any angle between vertical and horizontal.

We claim:

1. A drive coupler (102, 104) for coupling a reciprocating knife (106) to a drive member (112, 114), wherein the reciprocating knife includes at least one elongate bar (120, 122) having a longitudinal extent and fixed to a plurality of blades (138), wherein the at least one elongate bar (120, 122) is supported on support members (140) that constrain the at least one elongate bar (120, 122) to reciprocate in a direction generally parallel to the longitudinal extent of the at least one elongate bar (120, 122), the drive coupler (102, 104) comprising:

a first elongate strap (146) extending in a first direction longitudinally along, and being attached to the at least one elongate bar (120, 122);

a second elongate strap (162) extending opposite from said first elongate strap (146) in a second direction longitudinally along, and being attached to the at least one elongate bar (120, 122); and a flexible joint arrangement (152, 164, 187, 189, 193, 200) connecting the first and second elongate straps (146 and 162) to the drive member (112, 114) and connecting the first elongate strap (146) to the second elongate strap (162), the flexible joint arrangement (152, 164, 187, 189, 193, 200) permitting (i) up and down flexing of the first elongate strap (146) with respect to the second elongate strap (162), (ii) up and down flexing of the first elongate strap (146) with respect to the drive member (112, 114), and (iii) up and down flexing of the second elongate strap (162) with respect to the drive member (112, 114).

2. The drive coupler (102, 104) of claim 1, wherein the flexible joint arrangement comprises at least two flexible joints (152, 164, 187, 189, 193, 200).

3. The drive coupler (102, 104) of claim 2, wherein the at least two flexible joints (152, 164, 187, 189, 193, 200) each comprise a resilient member (156, 174).

4. The drive coupler (102, 104) of claim 2, wherein the at least two flexible joints (152, 164, 187, 189, 193, 200) comprise a first pin (186) fixed to the drive member (112, 114) and wherein a first annulus (184) is fixed to the first elongate strap (146) and a second annulus (192) is fixed to the second elongate strap (162) and wherein both the first annulus (184) and the second annulus (192) are received on the pin (186).

5. The drive coupler (102, 104) of claim 2, wherein the at least two flexible joints (152, 164, 187, 189, 193, 200) comprise a first pin (154) fixed to the first elongate strap (146), a second pin (172) fixed to the second elongate strap (162), a first annulus (158) fixed to the drive member (112, 114) and received on the first pin (154), and a second annulus (176) fixed to the first elongate strap (146) and received on the second pin (172).

6. The drive coupler (102, 104) of claim 2, wherein the flexible joint arrangement comprises a first upright pin (186) fixed to the drive member (112, 114), a first annulus (188) fixed to the first elongate strap (146) and positioned so as to surround said upright pin (186), a second annulus (192) fixed to the second elongate strap (162) and positioned so as to surround said upright pin (186) and a resilient first ring member (156) being disposed inside the first annulus (188) and on said upright pin (186) and a resilient second ring member (174) being disposed inside the second annulus (192) and on said upright pin (186).

7. The drive coupler (102, 104) of claim 1, wherein the flexible joint arrangement comprises a first pin (154) that is fixed to and that extends upwardly from the first elongate strap (146) and a second pin (172) that is fixed to and extends upwardly from the second elongate strap (162), wherein a first annulus (158) is fixed to the drive member (112,114) and received on the first pin (154), wherein a second annulus (176) is fixed to the first elongate strap (146) and received on the second pin (172), wherein a resilient first ring member (156) is mounted in said first annulus (158) and on said first pin (154) and wherein a resilient second ring member (174) is mounted in said second annulus (176) and on said second pin (172).

8. The drive coupler (102, 104) of claim 1, wherein the flexible joint arrangement comprises a first pin (194) that is fixed to and extends upwardly from the first elongate strap (146) and a second pin (202) that is fixed to and that extends upwardly from the second elongate strap (162)), wherein a first annulus (196) is fixed to the drive member (112,114) and received on the first pin (194), wherein a second annulus (204) is fixed to the drive member (112, 114) and received on the second pin (202), wherein a first resilient ring member (156) is mounted in said first annulus (196) and on said first pin (194) and wherein a second resilient ring member (174) is mounted in said second annulus (204) and on said second pin (202).

9. The drive coupler (102, 104) of claim 1, wherein the flexible joint arrangement comprises an upright pin (186) carried by the drive member (112, 114), a first annulus (184) fixed to the first elongate strap (146) and surrounding said pin (186), a second annulus (192) fixed to the second elongate strap (162) and surrounding said pin (186) and first and second resilient ring members (156 and 174) respectively received in the first annulus (184) and in the second annulus (192) and on the upright pin 186.

10. The drive coupler (102, 104) of claim 1, wherein the flexible joint arrangement comprises:
a first upright pin (194) fixed to the first elongate strap (146);
a second upright pin (202) fixed to the second elongate strap (162);
a first annulus (196) fixed to the drive member (112, 114) and received about the first upright pin (194);
a second annulus (204) fixed to the drive member (112, 114) and received about the second upright pin (202);
a first resilient member (156) (156, 174) in the form of a ring that is received in said first annulus (196) and surrounds the first pin (194); and
a second resilient member (174) in the form of a ring that is received in said second annulus (204) and surrounds the second pin (202).

11. The drive coupler (102, 104) of claim 1, wherein the flexible joint arrangement comprises a first annulus (184, 192) that is fixed to at least one of the first elongate strap (146) and the second elongate strap (162).

12. The drive coupler (102, 104) of claim 11, wherein the flexible joint arrangement further comprises a second annulus (184, 192) that is fixed to a second one of the first elongate strap (146) and the second elongate strap (162).

13. The drive coupler (102, 104) of claim 1, wherein the first elongate strap (146) has a first plurality of holes (148) that are spaced apart along the first elongate strap (146), wherein the first elongate bar contains a further plurality of holes respectively axially aligned with the first plurality of holes (148) to define a first plurality of aligned sets of holes and each aligned set of holes of said first plurality of aligned sets of holes receiving a removable fastener to fasten the first elongate strap (146) to the at least one elongate bar (120, 122).

14. The drive coupler (102, 104) of claim 13, wherein the second elongate strap (162) has a second plurality of holes (166) that are spaced apart along the second elongate strap (162), wherein the second elongate bar contains a third plurality of holes respectively axially aligned with the second plurality of holes (166) to define a second plurality of aligned sets of holes and each aligned set of holes of the second plurality of aligned sets of holes receiving a removable fastener to fasten the second elongate strap (162) to the at least one elongate bar (120, 122).

15. The drive coupler (102, 104) of claim 14, wherein the at least one elongate bar (120, 122) includes a first elongate bar section (182) and a second elongate bar section (180), and further wherein the first elongate strap (146) is fastened to the first elongate bar section (182), and the second elongate strap (162) fastened to the second elongate bar section (180).

* * * * *